United States Patent
Schultz et al.

[15] 3,639,233
[45] Feb. 1, 1972

[54] WELL DRILLING

[72] Inventors: Roger L. Schultz; James C. Baggett; Raymond E. McGlothlin, all of Houston, Tex.

[73] Assignee: Dresser Industries, Inc., Dallas, Tex.

[22] Filed: Mar. 18, 1969

[21] Appl. No.: 808,344

[52] U.S. Cl. ..................................252/8.5 M, 252/8.5 P
[51] Int. Cl. ...........................................C10m 1/08
[58] Field of Search....................252/8.5 M, 8.5 P

[56] References Cited

UNITED STATES PATENTS

| | | | |
|---|---|---|---|
| 2,099,825 | 11/1937 | Rolshausen et al. | 252/8.5 |
| 2,222,949 | 11/1940 | Henkes | 252/8.5 |
| 2,297,660 | 9/1942 | Mazee | 252/8.5 |
| 2,360,992 | 10/1944 | Weiss | 252/8.5 |
| 2,573,960 | 11/1951 | Fischer | 252/8.5 |
| 2,702,787 | 2/1955 | Freeland | 252/8.5 |

*Primary Examiner*—Herbert B. Guynn
*Attorney*—Robert W. Mayer, Daniel Rubin, Peter J. Murphy, Frank S. Troidl, Roy L. Van Winkle, William E. Johnson, Jr. and Roderick W. MacDonald

[57] ABSTRACT

Method for preventing the settling out of a weighting agent from a drilling fluid when the drilling fluid is substantially water free by using certain hydroxy compounds such as 1,2-ethanediol, and the drilling fluid formed by the method. Also, a method for preventing plugging of wells containing substantial amounts of sulfur.

8 Claims, No Drawings

WELL DRILLING

BACKGROUND OF THE INVENTION

Heretofore wells containing substantial amounts of sulfur either in the elemental form or compound form, e.g., hydrogen sulfide, including wells which were drilled to recover sulfur itself from underground strata, have encountered plugging problems during drilling, completion, and workover when conventional organic base drilling fluids containing substantial amounts of water were employed. It was found that the sulfur in the well reacted with the water and hydrocarbon in the drilling fluid to produce a rubbery, solid gel. The gel plugged the casing and stopped drilling or production of the well.

To prevent the formation of rubbery gel in the well, water was eliminated from the drilling fluid. However, it was found that with the elimination of the water, the weighting agent present in the drilling fluid tended to settle out rapidly. This made the drilling fluid unacceptable because a primary prerequisite of a useful drilling fluid is that the weighting agent in the drilling fluid remain in suspension in the drilling fluid even when drilling of the well is shut down for extended periods of time thereby. Undue settling of the weighting material during drilling stoppage can also plug the well with settled out weighting material.

Thus, the elimination of water from the drilling fluid did not solve the problem. In order to maintain the weighting agent suspended in the drilling fluid in the absence of water in the drilling fluid, the obvious approach was taken of adding materials such as clays, asphalt, and the like to the drilling fluid to increase the viscosity thereof and thereby hinder the settling out of the weighting agent. This approach was not successful in that the settling out of the weighting agent was not reduced to a level acceptable for commercial usage.

It was then unexpectedly discovered that the use of certain hydroxy compounds which were then known as thinners, i.e., viscosity reducers, substantially stopped the settling out of weighting agent when used in a drilling fluid which contains substantially no water. Thus, the problem was surprisingly solved by using a thinner rather than a thickener.

Accordingly, this invention relates to a method for the prevention of settling out of weighting agent from a substantially water-free, organic base drilling fluid by utilizing certain hydroxy compounds.

This invention also relates to the organic base drilling fluid itself containing, besides emulsifier and weighting agent, certain hydroxy compounds in an amount effective for substantially preventing settling out of weighting agent.

This invention also relates to a method for preventing plugging of a well which contains substantial amounts of sulfur during drilling and after drilling, including completion, workover and production, by using the drilling fluid of this invention.

The term "drilling fluid" is meant to cover in this invention, fluids such as drilling muds used for drilling in, completing, and working over wells, as packer fluids, and the like.

Accordingly, it is an object of this invention to provide a new and improved method for preventing the settling out of weighting agent, particularly from organic base drilling fluids which contain substantially no water. It is another object of this invention to provide a new and improved drilling fluid. It is another object to provide a method for preventing plugging of wells which contain substantial amounts of sulfur and/or sulfur containing materials therein.

Other aspects, objects, and advantages of this invention will be apparent to those skilled in the art from this disclosure and appended claims.

DETAILED DESCRIPTION OF THE INVENTION

Settling out of weighting agent is prevented in a substantially water free, organic base drilling fluid by the use of at least one hydroxy compound.

The hydroxy compounds that can be employed alone or in any combination as an admixture are polyhydroxy alkanes (linear or branched) having from two to 10, inclusive, carbon atoms per molecule and two to 10, inclusive, hydroxy radicals per molecule; polyhydroxy cycloalkanes (including branched) having from three to 12, preferably five to eight, inclusive, carbon atoms per molecule and two to 12, preferably, two to eight, inclusive, hydroxy radicals per molecule; dihydroxy phenols; trihydroxy phenols; polyethylene glycols according to the formula $HO(CH_2CH_2O)_xCH_2CH_2OH$ where $x$ is one to 1,000, preferably one to 100, inclusive, and polypropylene glycols according to the formula $HO(CH_2CH_2CH_2O)_yCH_2CH_2CH_2OH$ where $y$ is one to 1,000, preferably one to 100, inclusive.

Examples of suitable hydroxy compounds include 1,2-ethanediol, 1,2-propanediol, 1,2,3-propanetriol, 1,2-butanediol, 1,3-butanediol, 1,4-butanediol, 1,2,4-butanetriol, 2,3-butanediol, 2,2-dimethyl-1,3-propanediol, 2-methyl-2,4-pentanediol, 2-ethyl-1,3-hexanediol, 2,5-dimethyl-2,5-hexanediol, 1,5-pentanediol, glycerol, 1,2,6-hexanetriol, diethylene glycol, triethylene glycol, dipropylene glycol, tripropylene glycol, catechol, resorcinol, hydroquinone, pyrogallol, and phloroglucinol, 1,8-decanediol, 1,3-cyclopentanediol, 1,2-cyclopentanediol, 1,5-cyclooctanediol, 1,3,5-cyclooctanediol, 1,3-diethyl-2,5-cyclooctane, and the like.

The hydroxy compound or compounds can be incorporated in the drilling fluid by mixing at ambient conditions of pressure and temperature for a time sufficient to provide a substantially homogeneous mixture. Generally, mixing will be carried out at room temperature and atmospheric pressure for at least 1 minute. Mixing can also be carried out at subambient and superambient temperatures and pressures if desired, the ultimate goal being a substantially homogeneous mixture. Of course, temperatures below the freezing point of the component of the drilling fluid which freezes at the highest temperature with respect to the other components and temperatures above the boiling point of the component of the drilling fluid which boils at the lowest temperatures with respect to the other components of the drilling fluid are general limits of the temperature for any given pressure. The applicable pressure range is only limited by the capacity of the apparatus employed.

To the substantially water free, organic base drilling fluid, there is added at least one of the above-defined hydroxy compounds in an amount effective to prevent substantial settling out of the weighting agent. The amount of hydroxy compound employed will vary widely depending upon the composition and desired degree of stability of the drilling fluid based upon the drilling conditions to which the fluid is to be exposed. Generally, from about 1 to about 10 weight percent of the hydroxy compound or compounds will be sufficient to prevent substantial settling of the weighting agent.

The drilling fluid contains an organic, i.e., substantially hydrocarbon, base. There are two general types of organic base drilling fluids, one being the so-called "oil-base" fluid which contains a large amount, e.g., from about 20 to about 75 weight percent of the organic base based on the total weight of the fluid, the remainder being emulsifier, weighting agent, and the like, and the so-called "invert emulsion" which employs similar organic bases but less thereof, e.g., from about 17 to about 40 weight percent organic base based on the total weight of the fluid, the remainder being essentially emulsifier, weighting agent, and the like. Thus, the drilling fluids of this invention will contain from about 17 to about 75, preferably from about 64 to about 74, weight percent organic base, based upon the total weight of the drilling fluid.

The organic base used in the organic base drilling fluids is substantially all hydrocarbon materials such as crude oil, Diesel oil, kerosene, gas oil, fuel oil, heavy petroleum refinery liquid residues, asphalt in its normal state, asphalt which has been oxidized by bubbling air therethrough to increase the softening point thereof, lampblack, and the like. This invention applies to any organic base material or materials conventionally used in preparing "oil-base" and "invert" drilling fluids.

The emulsifiers employed are those conventionally employed in organic drilling fluids and can be of widely varying composition. The emulsifier will normally be present in an effective emulsifying amount which can generally be from about 0.5 to about 3 weight percent based upon the total weight of the organic base. The emulsifier can be a metal soap of fatty acids having 10 to 31, preferably 16 to 22, carbon atoms per molecule, inclusive, metal soaps of tall oil, and metal soaps of resin oil. The metals can be alkali metals (lithium, sodium, potassium, rubidium, cesium, and francium), alkaline earth metals (beryllium magnesium calcium, strontium, barium, and radium), copper, lead, zinc, tin, cadmium, aluminum, iron, nickel, cobalt, manganese, molybdenum, tungsten, and chromium. The metal soaps can be used with or without solubilization by reaction with ethylene oxide, amines, amides, and the like, and the recitation of metal soaps in this invention covers both the solubilized and nonsolubilized soaps.

The weighting agent employed is also a conventional material such as barium sulfate, barium carbonate, calcium carbonate, lead sulfide, and the like including mixtures thereof. The weighting agent is employed in an effective weighting amount which can vary widely depending upon the composition of the drilling fluid and the desired use and characteristics of that drilling fluid. Generally, from about 1.5 to about 70 weight percent of weighting agent based on the total weight of the organic base can be employed. With organic base drilling fluids, sufficient weighting material is added to give the final fluid a density of from about 7.2 to about 22 pounds per U.S. gallon.

The drilling fluid can optionally contain viscosity increasing amounts of at least one clay and/or asphaltic material. The clays are conventional materials such as kaolins (Kaolinite, Halloysite, Dickite, Nacrite, and Endellite), bentonites (Montmorillonite, Beidellite, Nontronite, Hectorite, and Saponite), hydrous micas (Bravaisite or Illite), attapulgite, sepiolite, and the like. These clays can be used in amounts of from about 1 to about 3 weight percent based on the total weight of the organic base. The asphaltic materials can be at least one of bitumen, e.g., natural occuring bitumens such as the high purity Gilsonite, asphalt, asphaltenes, and mixtures thereof. Generally, the asphaltic material or materials employed have a softening point of at least 250° F. and are used in amounts of from about 1 to about 10 weight percent based upon the total weight of the organic base.

The drilling fluid of this invention should be prepared in a manner such that the final drilling fluid is substantially water free and is maintained substantially water free until used in the well. "Water free" means less than about 2, preferably less than about 0.5, weight percent water present based on the total weight of the final drilling fluid. Thus, it is preferred that the drilling fluid be prepared using substantially water-free materials, although any or all of the materials used in forming the drilling fluid can contain some water. This procedure is preferable to the procedure wherein substantial amounts of water are attempted to be removed from the final drilling fluid after it has been formed, although this procedure can be employed if desired.

The drilling fluid of this invention comprises an organic base containing at least one emulsifier, at least one weighting agent, and at least one hydroxy compound, the organic base, emulsifier, weighting agent, and hydroxy compound being those defined hereinabove and being used in amounts defined hereinabove. The drilling fluid is additionally characterized as being substantially water free as defined hereinabove.

This invention also relates to a method for preventing plugging of a well during drilling thereof or after drilling, e.g., completion, workover, and production, when the well contains substantial amounts of at least one of elemental sulfur and sulfur containing materials which react with conventional organic base drilling fluids that contain substantial amounts of water. The amount of sulfur or sulfur containing materials present which will cause a plugging problem can vary widely depending upon the composition of the drilling fluid and the drilling conditions but is generally that amount which, when reacted with the aqueous phase of an organic base drilling fluid, causes plugging of the annulus between the tubing and the casing. Generally, the total fluid effluent from the well will contain at least 1 weight percent sulfur or sulfur containing materials based on the total weight of the well effluent.

The plugging prevention method of this invention involves the use of the drilling fluid of this invention as the drilling fluid for the well during drilling and as the packer fluid for the well either during or after drilling or both. By the use of the unique drilling fluids of this invention, plugging of the sulfur containing wells by reaction of the organic base drilling fluid with sulfur is substantially eliminated.

EXAMPLE

In attempting to solve the weighting agent settling problem, drilling fluids were prepared using various additives known to aid in the prevention of weighting agent settling by viscosity promotion. In these runs, asphalt, bentonite clay, Bentone, and asbestos were used, but the settling problem not solved.

Each of these drilling fluids contained Diesel oil, a magnesium fatty acid soap formed from fatty acids having from 16 to 22 carbon atoms per molecule, barium sulfate as the weighting agent, and one of the asphalt, bentonite clay, Bentone and asbestos.

Each drilling fluid was prepared by first providing 34.5 weight percent Diesel oil, adding thereto 3.5 weight percent of the soap, thereafter adding 58.5 weight percent barite and finally adding 3 weight percent of one of the bentonite clay, asphalt, Bentone, or asbestos. In these runs the asphalt had a softening point (ASTM D36-64T) of 310° F. The Bentone was composed of dimethyl dihydrogenatedtallow ammonium chloride reacted on a refined sodium montmorillonite. The asbestos was in the form of chrysolite fibers. The bentonite was subdivided to 1–4 microns.

A drilling fluid according to this invention was prepared using the same amounts of Diesel oil, magnesium fatty acid soap having from 16 to 22 carbon atoms per molecule, and barium sulfite as set forth above. However, in lieu of the viscosity promoter, 3 weight percent of 1,2-ethanediol, a known thinner, was employed. The procedure for preparing this drilling fluid was the same as that set forth above for the other drilling fluids.

The drilling fluids were then tested for their barite settling characteristics by placing 350 cubic centimeters of each drilling fluid into a sealed container and heating at 400° F. under static conditions (no stirring) for 16 hours. The container was then exposed to ambient conditions and allowed to cool to room temperature. The height of the settled layer of barite, if any, on the bottom of the container was measured. The results were as follows:

TABLE

| Run number | Height of Barite settled layer, inches |
| --- | --- |
| 1 (Bentone) | ¾ |
| 2 (asphalt) | 2 |
| 3 (bentonite) | 1 |
| 4 (asbestos) | 1 ½ |
| 5 (1,2-ethanediol) | 0 (no settled layer) |

It can be seen from the above that the 1,-2-ethanediol additive substantially reduced the barite settling characteristics of the drilling fluid as compared to runs 1 through 4 which employed known agents for reducing barite settling. This was extremely unexpected since 1,2-ethanediol is known as a thinner and not as a material for increasing the viscosity of an oil-base drilling fluid.

The amount of settling experienced in runs 1 through 4 rendered those drilling fluids commercially unacceptable, whereas the drilling fluid of run 5 was commercially accepted.

Reasonable variations and modifications are possible within the scope of this disclosure without departing from the spirit and scope of this invention.

The embodiments of the invention in which an exclusive property or privilege is claimed are defined as follows:

1. A method for preventing the settling of weighting agent from a substantially water free oil base drilling fluid containing less than about 2 percent water comprising providing a substantially water free hydrocarbon oil base containing an effective emulsifying amount of at least one emulsifier selected from the group consisting of metal soaps of fatty acids having 10 to 31 carbon atoms per molecule and metal soaps of tall oil and an effective weighting amount of at least one weighting agent selected from the group consisting of barium sulfate, barium carbonate, calcium carbonate and lead sulfide, adding to said hydrocarbon oil base at least one hydroxy compound of the group
   1. 1,2-ethanediol,
   2. polyhydroxy cycloalkane having from three to 12, inclusive, carbon atoms per molecule and two to 12, inclusive, hydroxy radicals per molecule,
   3. dihydroxy phenol,
   4. trihydroxy phenol,
   5. $HO(CH_2CH_2CH_2O)_yCH_2CH_2CH_2OH$ where $y$ is 1 to 1000, said hydroxy compound being present in an amount effective to prevent substantial settling out of said weighting agent, and maintaining the resulting mixture substantially water free.

2. The method according to claim 1 wherein said hydroxy compound group is 1,2-ethanediol, catechol, resorcinol, hydroquinone, pyrogallol, and phloroglucinol.

3. The method according to claim 1 wherein there is also present at least one of clay and asphaltic material in a viscosity increasing amount.

4. The method according to claim wherein said emulsifier is present in the amount of from about 0.5 to about 3 weight percent based on the total weight of the drilling fluid, said metal of the metal soaps being selected from the group consisting of alkali metals, alkaline earth metals, Cu, Pb, Zn, Sn, Cd, Al Fe, Ni, Co, Mn, Mo W and Cr, said weighting agent is present in the amount of from about 1.5 to about 70 weight percent based on the total weight of the drilling fluid, and said hydroxy compound is present in an amount of from about 1 to 10 weight percent based on the total weight of said drilling fluid.

5. A drilling fluid containing less than about 2 weight percent water consisting essentially of an hydrocarbon oil, an effective emulsifying amount of at least one emulsifier selected from the group consisting of metal soaps of fatty acids having 10 to 31 carbon atoms per molecule and metal soaps of tall, oil, an effective weighting amount of at least one weighting agent selected from the group consisting of barium sulfate, barium carbonate, calcium carbonate and lead sulfide, at least one hydroxy compound of the group
   1. 1,2-ethanediol
   2. polyhydroxy cycloalkane having from three to 12, inclusive, carbon atoms per molecule and two to 12, inclusive, hydroxy radicals per molecule,
   3. dihydroxy phenol,
   4. trihydroxy phenol,
   5. $HO(CH_2CH_2CH_2O)_yCH_2CH_2CH_2OH$ where $y$ is 1 to 1,000, said hydroxy compound being present in an amount effective for substantially preventing settling out of said weighting agent, said fluid being additionally characterized as substantially water free.

6. The drilling fluid according to claim 5 wherein said hydroxy compound group is 1,2-ethanediol, catechol, resorcinol, hydroquinone, pyrogallol, and phloroglucinol.

7. The drilling fluid according to claim 5 wherein there is also present at least one of clay and asphaltic material in a viscosity increasing amount.

8. A drilling fluid according to claim 5 wherein said emulsifier is present in the amount of from about 0.5 to about 3 weight percent based on the total weight of the drilling fluid, said metal of the metal soaps being selected from the group consisting of alkali metals, alkaline earth metals, Cu, Pb, Zn, Sn, Cd, Al, Fe, Ni, Co, Mn, Mo, W and Cr, said weighting agent is present in the amount of from about 1.5 to about 70 weight percent based on the total weight of the drilling fluid, and said hydroxy compound is present in an amount of from about 1 to 10 weight percent based on the total weight of said drilling fluid.

* * * * *